US012638183B2

(12) United States Patent　　　(10) Patent No.:　　US 12,638,183 B2
Eggels　　　　　　　　　　　　　　　(45) Date of Patent:　　　May 26, 2026

(54) INJECTOR ASSEMBLY FOR AN ENGINE, AND AIRCRAFT

(71) Applicant: Rolls-Royce Deutschland Ltd & Co KG, Blankenfelde-Mahlow (DE)

(72) Inventor: Ruud Eggels, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 19/235,235

(22) Filed: Jun. 11, 2025

(65) Prior Publication Data

US 2025/0383090 A1　　　Dec. 18, 2025

(30) Foreign Application Priority Data

Jun. 13, 2024　(DE) ...................... 10 2024 205 468.2

(51) Int. Cl.
| | |
|---|---|
| *F23R 3/20* | (2006.01) |
| *B64D 37/30* | (2006.01) |
| *F23R 3/14* | (2006.01) |

(52) U.S. Cl.
CPC ................ *F23R 3/20* (2013.01); *B64D 37/30* (2013.01); *F23R 3/14* (2013.01)

(58) Field of Classification Search
CPC ... B64D 37/30; F23R 3/20; F23R 3/04; F23R 3/12; F23R 3/14
See application file for complete search history.

(56) References Cited

U.S. PATENT DOCUMENTS

| | | | |
|---|---|---|---|
| 6,123,273 | A | 9/2000 | Loprinzo |
| 7,921,650 | B2 | 4/2011 | Oda |
| 10,054,093 | B2 | 8/2018 | Spivey |
| 10,794,596 | B2 | 10/2020 | Dai |
| 11,525,403 | B2 | 12/2022 | Morenko |

(Continued)

FOREIGN PATENT DOCUMENTS

| | | |
|---|---|---|
| DE | 102022201182 A1 | 8/2023 |
| DE | 102022202935 A1 | 9/2023 |

OTHER PUBLICATIONS

German Search Report dated Mar. 13, 2025 from counterpart German App No. 102024205468.2.

(Continued)

*Primary Examiner* — Rodolphe Andre Chabreyrie

(74) *Attorney, Agent, or Firm* — SHUTTLEWORTH & INGERSOLL, PLC; Timothy J. Klima

(57)　　　　ABSTRACT

An engine injector assembly for introducing a gaseous fuel, a liquid fuel and air into a combustion chamber, has a stem and main body oriented along an axis. The main body includes: a central air duct on the axis, having an outlet for directing a central air flow, an outer air duct running radially outside around the central air duct, having an outlet for directing an external air flow, a liquid fuel supply radially between the central and outer air ducts, having a liquid fuel duct and an outlet for introducing the liquid fuel, and a gas fuel supply radially between the liquid fuel supply and the outer air duct, having a gas fuel duct and an outlet for introducing the gaseous fuel. The outer air duct has, at its downstream end, a radially outwardly oriented end portion for directing radially outward the outer air flow.

19 Claims, 3 Drawing Sheets

(56)        References Cited

U.S. PATENT DOCUMENTS

Figure 1:
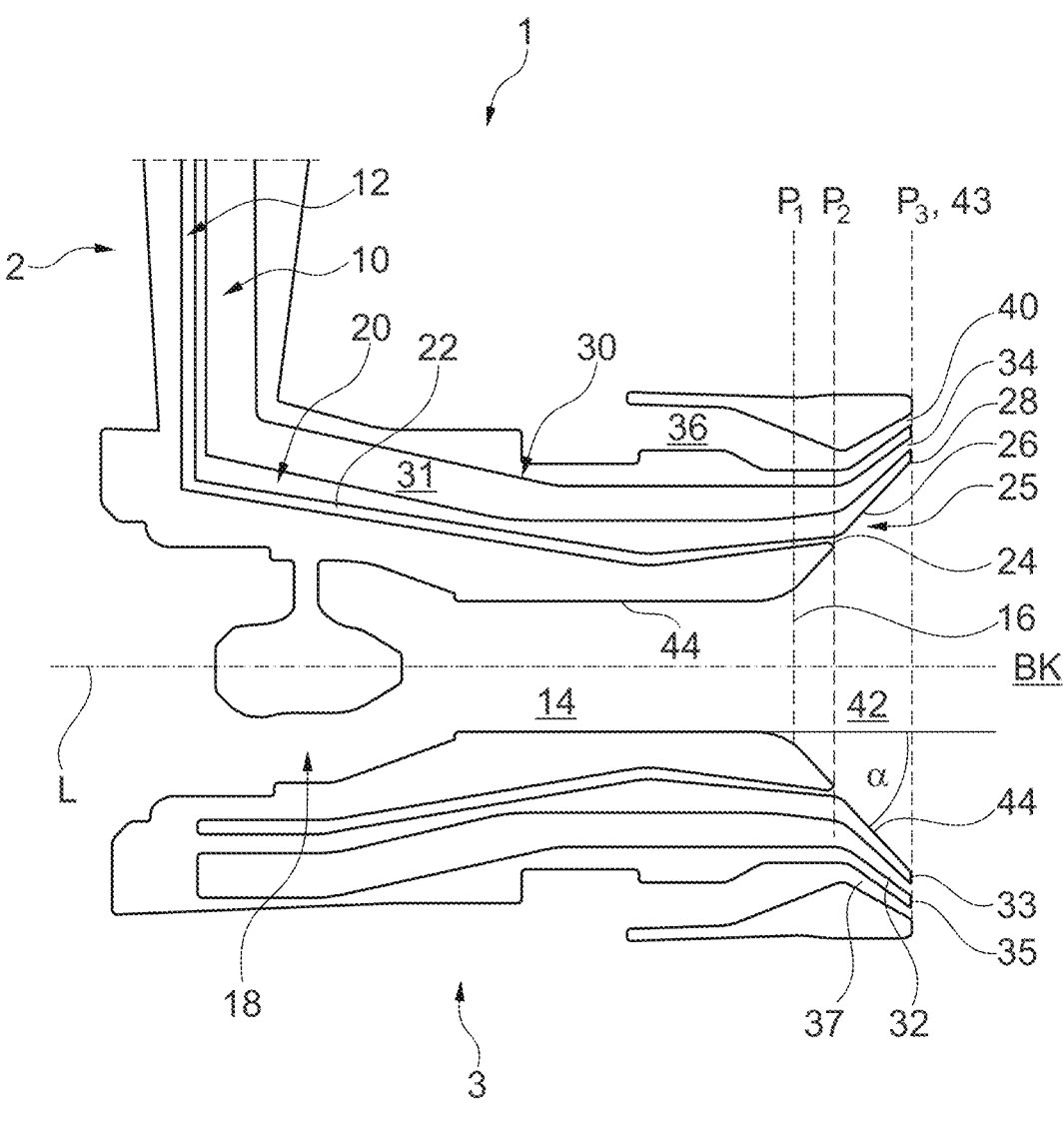

| | | | |
|---|---|---|---|
| 11,635,209 B2* | 4/2023 | Vukanti | .................. F23R 3/283<br>60/748 |
| 2010/0050644 A1 | 3/2010 | Pidcock | |
| 2016/0201897 A1 | 7/2016 | Snyder | |
| 2020/0003421 A1 | 1/2020 | Sanchez | |
| 2020/0025386 A1* | 1/2020 | Muldal | .................. F23R 3/343 |
| 2021/0108800 A1* | 4/2021 | Rogers | ................... F23R 3/283 |
| 2024/0044293 A1 | 2/2024 | Snyder | |

OTHER PUBLICATIONS

European Search Report dated Oct. 10, 2025 from counterpart European App No. EP25181869.

* cited by examiner

INJECTOR ASSEMBLY FOR AN ENGINE, AND AIRCRAFT

This application claims priority to German Patent Application 102024205468.2 filed Jun. 13, 2024, the entirety of which is incorporated by reference herein.

The invention relates to an injector assembly for an engine, in particular of an aircraft, for introducing a gaseous fuel, a liquid fuel and air into a combustion chamber, according to the present disclosure. The invention furthermore relates to an aircraft having an injector assembly and a fuel periphery.

For example, an injector assembly, or else nozzle assembly, of the type mentioned at the outset is specified in DE 10 2022 201 182 A1. In this document, a fuel injection means for the gaseous fuel is arranged radially on the outside around a central air duct, arranged on a longitudinal nozzle axis, a liquid fuel injection means and a second air duct.

US 2024/0044293 A1, U.S. Pat. No. 10,794,596 B3, US 2016/0201897 A1 and U.S. Pat. No. 11,525,403 B2 each disclose an injector assembly for introducing a gaseous fuel and a liquid fuel, having a central air duct, in different configurations.

U.S. Pat. No. 6,123,273 discloses a fuel injector for a gas turbine for adding a liquid fuel and a gaseous fuel into a combustion chamber, wherein a gaseous fuel supply assembly is arranged radially outside around a central liquid fuel supply assembly.

U.S. Pat. No. 10,054,093 B2 discloses a fuel injector for a gas turbine for adding a liquid fuel into a combustion chamber.

The invention is based on the object of providing an injector assembly of the type mentioned at the outset, and an aircraft, with advantageous emission characteristics.

For the injector assembly, and for the aircraft, the object is achieved by features as disclosed herein.

In terms of the injector assembly, it is provided that the outer air duct has, at its downstream end, a radially outwardly oriented end portion for directing radially outward the outer air flow flowing into the combustion chamber.

Due to the directional pulse outward, preferably, for example, substantially parallel to a likewise supplied flow of gaseous fuel, the mixing of the air flow with the gaseous fuel can be delayed, whereby the flame zone is further spaced apart from the injector main body, the thermal load on the injector thus being reduced.

Preferably, the outer air duct is configured so as run in an annular manner around the injector longitudinal axis.

Particularly preferably, the gas fuel supply has, at its downstream end, a radially outwardly oriented end portion for directing radially outward the gas flowing into the combustion chamber.

Preferably, the outer air duct is configured to supply the outer air flow into the combustion chamber at a high velocity, between 50 m/s and 150 m/s, in particular between 80 m/s and 100 m/s, and/or the gas fuel supply is configured to supply the gaseous fuel into the combustion chamber at a high velocity, between 50 m/s and 150 m/s, in particular between 80 m/s and 100 m/s. Here, the flow cross sections are, in particular, correspondingly adapted, taking into account the operating states, for which the injector assembly is designed. In this way, in the operation using the highly reactive gaseous fuel, the combustion zone can be moved downstream of the injector assembly, the thermal load on the injector assembly thus being reduced.

Exclusively the gas fuel duct and the liquid fuel duct are preferably arranged as fluid ducts between the central air duct and the outer air duct, wherein exclusively the two air ducts, i.e. the central air duct and the outer air duct, are preferably present.

In order to achieve an ideally homogeneous flow pattern for facilitating a low-emission combustion, the outlet opening of the gas fuel supply and/or the outlet opening of the liquid fuel supply are/is preferably configured so as to run around in an annular manner.

Advantages in production can be achieved if a wall delimiting the gas fuel duct on the radial inside ends so as to be axially set back from a wall delimiting the gas fuel duct on the radial outside. The wall arranged on the radial outside is preferably configured as an (ideally thin-walled) guide element between the gas fuel duct and the outer air duct. Due to the momentum of the axial-radial air flow, into which the gaseous fuel emerging from the outlet opening is introduced, the gas flow is likewise directed axially-radially toward the outside.

For an advantageous, ideally homogeneous introduction of the liquid fuel into the air flow, the liquid fuel duct preferably has, at its downstream end, an atomizer assembly having the outlet opening and a film applicator surface. A trailing edge is preferably arranged at the downstream end of the film applicator surface.

In a preferred design variant, the central air duct opens at a first axial position on a downstream opening region of the injector main body, wherein the opening region preferably extends from the first axial position as far as a downstream end of the injector main body at a third axial position, and wherein, within the opening region, a wall which surrounds the central air duct upstream of the first axial position runs radially outward at an angle $\alpha$ of more than 20°, in particular of more than 30° or 40°, with regard to the injector longitudinal axis. In this way, the opening region has, starting from the outlet opening of the central air duct, a type of conical shape. The wall can consist of a plurality of portions, for example with intervening outlet openings of other fluid ducts, for example of the liquid fuel supply. The wall extends (axially) in the region of the central air duct preferably at least substantially parallel to the injector longitudinal axis and then merges, for example, consistently or in small angular gradations into the inclination within the opening region.

Preferably, the liquid fuel duct opens by way of the outlet opening (with regard to the axial assembly) within the central air duct or in the opening region at a second axial position downstream of the first axial position.

Preferably, the gas fuel duct opens by way of the outlet opening into the opening region downstream of the liquid fuel duct at the downstream end of the injector main body (at the third axial position) or upstream of the downstream end. In this way, during operation, the gaseous fuel is added comparatively far downstream of the air flow supplied through the central air duct, thereby reducing the risk of auto-ignition and flashback within the region of the injector main body and moving the combustion zone into the combustion chamber. In this way, the thermal load on the injector assembly is advantageously reduced.

Preferably, the outer air duct opens by way of the outlet opening into the combustion chamber at least substantially at the level of the downstream end of the main injector body (in particular corresponding to the downstream end of the opening region).

Particularly preferably, a swirl generator is arranged in the central air duct. No swirl generator is preferably present in the outer air duct, for the benefit of an ideally minimum pressure loss, wherein the flow is guided axially-radially outward by means of the axially-radially extending end portion. It is also possible to arrange a swirl generator in the outer air duct. By means of the swirl generator, a circumferential swirl is imposed on the flow, as a result of which the flow expands radially outward after exiting the outlet opening. Here, the air flow guided through the central air duct is initially additionally directed radially outward, preferably at a defined angle, from the opening region.

Figure 2:
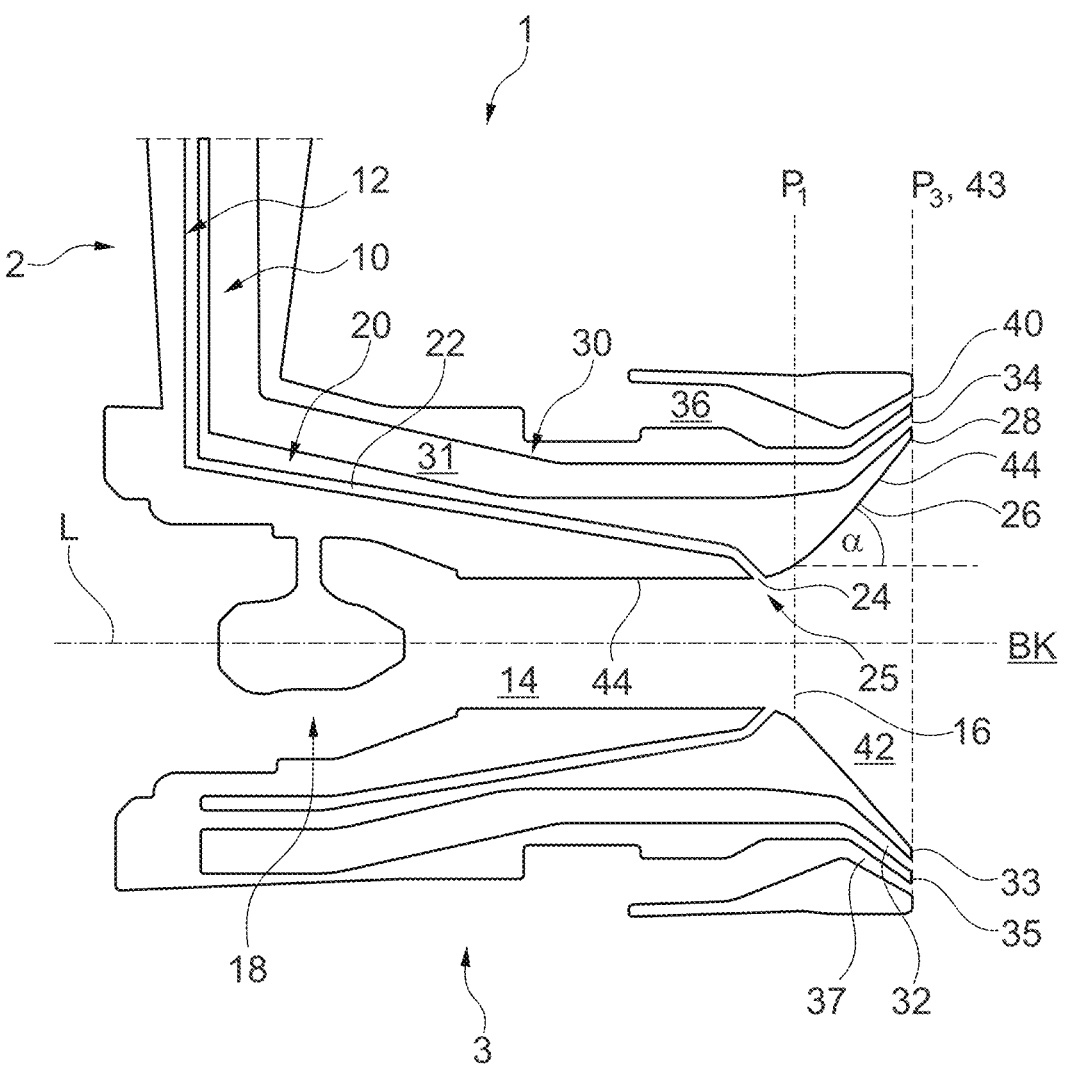
Figure 3:
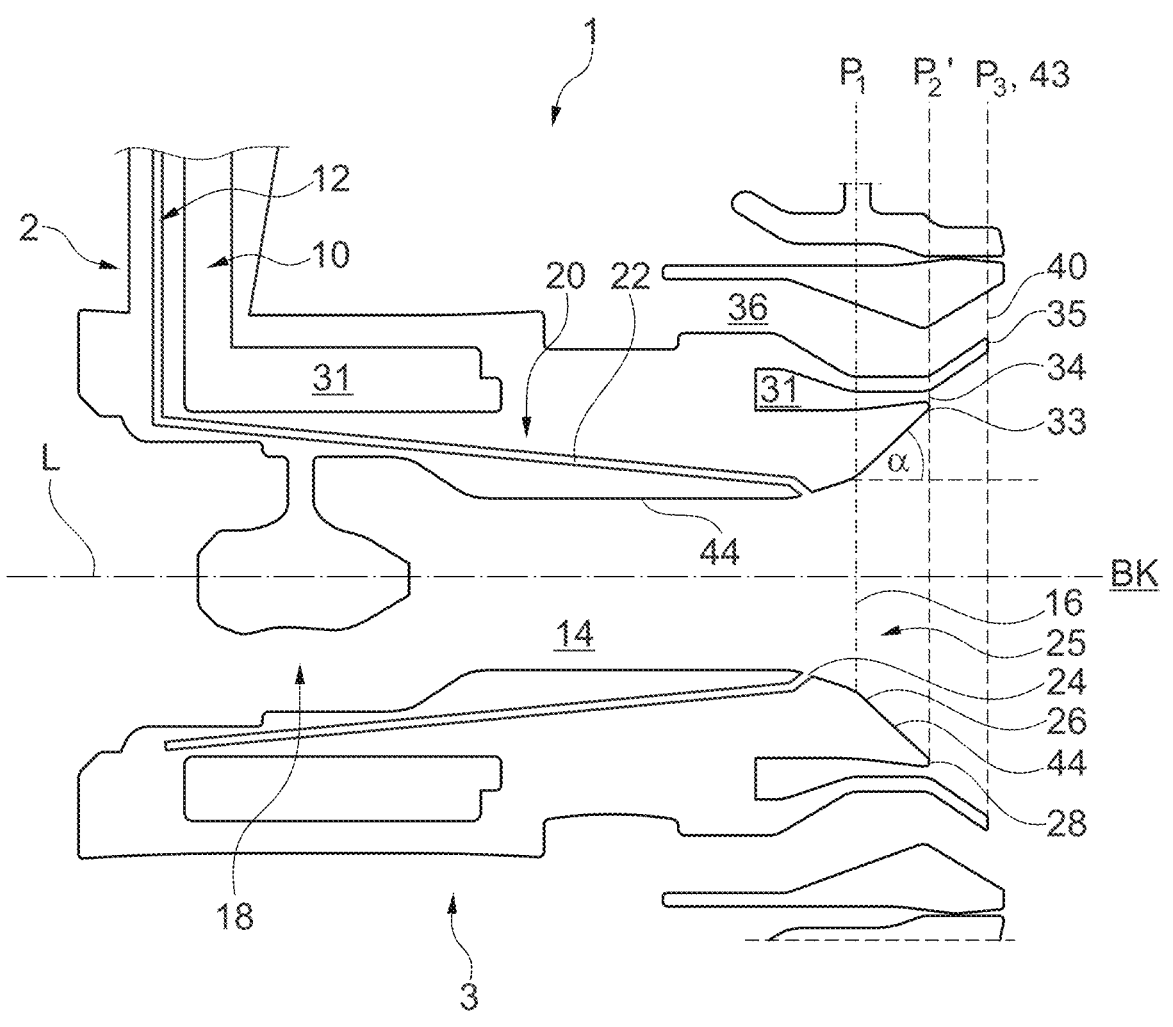

The invention will be explained in more detail in the following text on the basis of exemplary embodiments with reference to the drawings, in which:

FIG. 1 shows an injector assembly according to the invention for introducing a gaseous fuel and a liquid fuel into a combustion chamber of an engine, in a schematic illustration in a longitudinal section along the injector longitudinal axis, FIG. 2 shows a second design variant of the injector assembly in a schematic illustration in a longitudinal section along the injector longitudinal axis, and FIG. 3 shows a third design variant of the injector assembly in a schematic illustration in a longitudinal section along the injector longitudinal axis.

FIG. 1 shows a schematic longitudinal sectional illustration of an injector assembly 1 for introducing fuel and air into a combustion chamber BK of an engine, in particular of an aircraft. The injector assembly 1 has an injector stem 2 and an injector main body 3 arranged on the injector stem 2. The injector main body 3 is oriented along an injector longitudinal axis L running at an angle (in the present case, substantially orthogonally) with respect to the injector stem 2.

The injector assembly 1 is configured for operation with two types of fuel, a gaseous fuel and a liquid fuel. To this end, the injector assembly 1 comprises a liquid fuel supply 20 and a gas fuel supply 30. By means of the injector assembly 1, the fuels can be supplied to the combustion chamber BK both simultaneously (in parallel) in a combined operation and individually, in a separate operation of liquid and/or gaseous fuel.

Both a gas fuel supply line 10 and a liquid fuel supply line 12 are arranged in the injector stem 2 for the fuel supply line. In FIG. 1, the two fuel supply lines 10, 12 by way of example run parallel to one another.

The gaseous fuel is formed, in particular, from hydrogen and/or comprises hydrogen. The liquid fuel is formed, in particular, from kerosene and/or a sustainable alternative fuel (SAF). The aircraft has a correspondingly configured fuel periphery (not shown in FIG. 1).

The injector assembly 1 comprises a central air duct 14 which extends on the injector longitudinal axis L, has a downstream outlet opening 16, and is configured for directing a central air flow in the direction of the combustion chamber BK. The central air duct 14 is of at least partially cylindrical configuration and is surrounded by a wall 44 running substantially parallel to the injector longitudinal axis L. Arranged within the central air duct 14 is a swirl generator 18 for imposing a swirl on the air flowing through the air duct 14 during operation.

The central air duct 14 opens by way of the outlet opening 16 at a first axial position P1 into an opening region 42, within which, in the present case by way of example, the wall 44 opens conically toward the outside. The wall 44 can comprise a plurality of wall portions, for example subdivided by outlet openings of other ducts. Within the opening region 42, the wall 44 runs radially outward at an angle α of more than 20°, preferably more than 30° or 40°, with regard to the injector longitudinal axis L. The opening region 42 extends, starting from the first axial position P1, as far as an axial position P3 at a downstream end 43 of the injector main body 3, where said opening region opens into the combustion chamber BK. During operation, the central air flow which, due to the superimposition of the swirl, flows radially outward is directed by means of the opening region 42 in a defined axially-radially outward manner for entry into the combustion chamber BK.

The liquid fuel supply 20 has at least one liquid fuel duct 22 which is arranged radially directly on the outside around the central air duct 14 (without any intervening further fluid duct), and which (optionally in each case) has a downstream outlet opening 24 for introducing the liquid fuel into the air flow and/or into the combustion chamber BK. Here, a plurality of discrete, individual fuel ducts can be present at least in portions next to one another in an annular arrangement around the central air duct 14, and/or the at least one liquid fuel duct 22 can at least in portions be configured as an annular duct which runs around in a contiguous manner.

The liquid fuel duct 22 preferably has, at its downstream end, an atomizer assembly 25 with the outlet opening 24, and a film applicator surface 26 which is arranged such that it can be passed over by the air flow and has a downstream (with regard to the liquid fuel flow) trailing edge 28.

In the present case, the liquid fuel duct 22 opens downstream of the first axial position P1 in the opening region 42, at a second axial position P2. The film applicator surface 26 is formed by that portion of the wall 44 that is arranged downstream of the outlet opening 24, wherein the trailing edge 28 is arranged by way of example at the third axial position P3.

The gas fuel supply 20 has at least one gas fuel duct 31 which is arranged radially directly on the outside around the at least one liquid fuel duct 22 (without any intervening further fluid duct), and which (optionally in each case) has a downstream outlet opening 34 for introducing the gaseous fuel into the air flow and/or into the combustion chamber BK. Here, the at least one gas fuel duct 31 is at least partially configured as an annular duct which runs around in a contiguous manner.

As shown in FIG. 1, the outlet opening 34 of the gas fuel duct 31 is arranged as far downstream as possible (with regard to the air flow supplied through the central air duct 14), at any rate downstream of the outlet opening 24 of the liquid fuel duct 22. In this way, the, in particular, highly reactive gaseous fuel is added as far downstream as possible from the air flow, with the result that early ignition (within the injector assembly) and/or a flashback are/is prevented.

For advantageous, emission-optimized flow routing, the gas fuel duct 31 has, at its downstream end, an axially-radially outwardly oriented end portion 32, by means of which the gas flow flowing into the combustion chamber BK is given a radially outward directional pulse. For example, the angle can be configured to be slightly smaller (for example, by up to 5° or 10°) than the angle α, or can substantially correspond to the angle α. The directional pulse outward can delay the adding of the gaseous fuel to the air flow somewhat, whereby the flame zone is further spaced apart from the injector main body 3, thus reducing the thermal load on the injector.

Radially directly (without an intervening further fluid duct) on the outside around the gas fuel duct 31, the injector main body 3 comprises an outer annular air duct 36 which preferably runs around in an annular manner and has a downstream outlet opening 40 for preferably directing an outer air flow directly (without flowing through the opening region 42) into the combustion chamber BK. Here, the outlet opening 40 is preferably positioned at the axial position P3 directly on the combustion chamber BK, at the downstream end of the opening region 42. No swirl generator is preferably arranged within the outer air duct 36.

The outer air duct 36 has, at its downstream end, a radially outwardly directed end portion 37, by means of which the outer air flow flowing into the combustion chamber BK is given a radially outward directional pulse. For example, the angle can be configured to be slightly smaller (for example, by up to 5° or 10°) than the angle α, or can substantially correspond to the angle α.

Preferably, both the outer air duct 36 and the gas fuel supply 30 having the gas fuel duct 31 are configured to supply the respective supplied gas (air or gaseous fuel) into the combustion chamber BK (or into the opening region 42) at a high velocity. For example, the velocity can be between 50 m/s and 150 m/s, in particular between 80 m/s and 100 m/s. In the case of the gaseous fuel, the velocity can also be higher, for example up to 300 m/s. Here, in particular, the flow cross sections are adapted correspondingly, taking into account the operating conditions, for which the injector assembly 1 is designed. In this way, during operation with the highly reactive gaseous fuel, the combustion zone can be shifted downstream from the injector assembly 1, the thermal load on the injector assembly 1 thus being reduced. In addition, when adding the gaseous fuel within the injector assembly 1 (upstream of the third axial position P3), a flashback into the injector assembly 1 is prevented.

The gas fuel duct 31 is delimited on the radial inside by a wall 33, and on the radial outside by a wall 35, which are, at least at their respective downstream ends, configured to be ideally thin-walled (in particular at the most as thick as necessary for mechanical stability). In this way, during operation, a flow separation between the air flow and the flow of the gaseous fuel in association with zones of low flow velocity is prevented, which can lead to a flame being undesirably stabilized at the injector assembly 1.

For a configuration of the injector assembly 1 that is favorable in terms of production, reliable in operation and at the same time optimized in terms of emissions, there are thus only the at least one liquid fuel duct 22 (or a plurality of ducts, in particular at a uniform radial position) and the at least one gas fuel duct 31 (or a plurality of ducts, in particular at a uniform radial position) and exclusively the two air ducts, the central air duct 14 and the outer air duct 36, present between the central air duct 14 and the outer air duct 36.

FIG. 2 shows a second design variant of the injector assembly 1, wherein the outlet opening 24 of the liquid fuel duct 22 is arranged within the central air duct 14, upstream of the axial position P1. The remaining embodiment of the injector assembly 1 shown in FIG. 2 corresponds to the configuration shown in FIG. 1.

FIG. 3 shows a third design variant of the injector assembly 1, wherein the wall 33 delimiting the gas fuel duct 31 on the radial inside ends downstream so as to be axially set back from the wall 35 delimiting the gas fuel duct 31 on the radial outside. Due to the axial-radially outward orientation of the wall 35 and the momentum of the air flow flowing axially-radially through the opening region 42, the gas fuel flow during operation is furthermore guided in a defined axially-radially outward manner. In this way, the gas fuel duct 31 opens at an axial position P2', upstream of the third axial position P3, within the opening region 42. This design variant is associated, in particular, with advantages in terms of production.

LIST OF REFERENCE SIGNS

1 Injector assembly
2 Injector stem
3 Injector main body
10 Gas fuel supply line
12 Liquid fuel supply line
14 Central air duct
16 Outlet opening
18 Swirl generator
20 Liquid fuel supply
22 Liquid fuel duct
24 Outlet opening
25 Atomizer assembly
26 Film applicator surface
28 Trailing edge
30 Gas fuel supply
31 Gas fuel duct
32 End portion
33 Wall
34 Outlet opening
35 Wall
36 Outer air duct
37 End portion
40 Outlet opening
42 Opening region
43 Downstream end
44 Wall
BK Combustion chamber
L Injector longitudinal axis
α Angle
P1 First position
P2, P2' Second position
P3 Third position

The invention claimed is:

1. An injector assembly for an aircraft engine, for introducing a gaseous fuel, a liquid fuel and air into a combustion chamber, comprising:

an injector stem and an injector main body oriented along an injector longitudinal axis, wherein the injector main body comprises:

a central air duct arranged on the injector longitudinal axis, having an outlet opening for directing a central air flow, an outer air duct arranged to be radially outwardly and around the central air duct, having an outlet opening for directing an external air flow, a liquid fuel supply arranged radially between the central air duct and the outer air duct, having at least one liquid fuel duct and an outlet opening for introducing the liquid fuel, and a gas fuel supply arranged directly radially between the liquid fuel supply and the outer air duct, having at least one gas fuel duct and an outlet opening for introducing the gaseous fuel, wherein the outer air duct has radially outwardly angles to form a radially outwardly oriented end portion for directing radially outwardly the outer air flow flowing into the combustion chamber.

2. The injector assembly according to claim 1, wherein the outer air duct runs in an annular manner around the injector longitudinal axis.

3. The injector assembly according to claim 1, wherein the radially outwardly oriented end portion of the gas fuel supply directs radially outwardly the gaseous fuel flowing into the combustion chamber.

4. The injector assembly according to claim 1, wherein the outer air duct supplies the outer air flow into the combustion chamber at between 50 m/s and 150 m/s.

5. The injector assembly according to claim 4, wherein the outer air duct supplies the outer air flow into the combustion chamber at between 80 m/s and 100 m/s.

6. The injector assembly according to claim 1, wherein the gas fuel supply supplies the gaseous fuel into the combustion chamber at between 50 m/s and 150 m/s.

7. The injector assembly according to claim 6, wherein the gas fuel supply supplies the gaseous fuel into the combustion chamber at between 80 m/s and 100 m/s.

8. The injector assembly according to claim 1, wherein exclusively the gas fuel duct and the liquid fuel duct are arranged as fluid ducts between the central air duct and the outer air duct.

9. The injector assembly according to claim 1, wherein the outlet opening of the gas fuel supply and/or the outlet opening of the liquid fuel supply runs around in an annular manner.

10. The injector assembly according to claim 1, wherein a wall delimiting the gas fuel duct on radial inside ends to be axially set back upstream from a wall delimiting the gas fuel duct on a radial outside.

11. The injector assembly according to claim 1, wherein the liquid fuel duct has, at a downstream end thereof, an atomizer assembly having the outlet opening of the liquid fuel duct and a film applicator surface.

12. The injector assembly according to claim 1, wherein the central air duct opens at a first axial position into an opening region of the injector main body, wherein the opening region extends from the first axial position as far as a downstream end of the injector main body, and wherein, within the opening region, a wall which surrounds the central air duct runs radially outwardly at an angle of more than 40°, with regard to the injector longitudinal axis.

13. The injector assembly according to claim 12, wherein the liquid fuel duct opens within the central air duct or in the opening region at a second axial position downstream of the first axial position.

14. The injector assembly according to claim 12, wherein the gas fuel duct opens into the opening region downstream of the liquid fuel duct at the downstream end of the injector main body or upstream of the downstream end.

15. The injector assembly according to claim 12, wherein the outer air duct opens into the combustion chamber at the level of the downstream end of the main injector body.

16. The injector assembly according to claim 12, wherein the angle is more than 30°, with regard to the injector longitudinal axis.

17. The injector assembly according to claim 16, wherein the angle is more than 40°, with regard to the injector longitudinal axis.

18. The injector assembly according to claim 1, wherein a swirl generator is arranged in the central air duct.

19. An aircraft, including:

the injector assembly according to claim 1, and a fuel periphery configured for the operation of the aircraft with the gaseous fuel and with the liquid fuel.

* * * * *